INVENTOR.
CARL H. SOLLMANN

United States Patent Office 3,250,303
Patented May 10, 1966

3,250,303
CONTAINER GUIDING AND SUPPORTING DEVICE FOR CONTAINER FILLING APPARATUS
Carl H. Sollmann, Far Hills, N.J., assignor to Walter Kidde & Company, Inc., Belleville, N.J., a corporation of New York
Filed Sept. 18, 1963, Ser. No. 309,728
1 Claim. (Cl. 141—372)

The present invention relates to apparatus for filling containers with fluent material, and, more particularly, to a device adapted to be attached to such apparatus for guiding and supporting the containers to be filled under the dispensing outlet of the apparatus.

The present invention is primarily concerned with, but not limited to, such a device adapted to be attached to apparatus which is used in establishments where food is served to dispense cream directly into cups, bowls and the like and small jars for containing an individual serving of cream. Such apparatus generally comprises a dispensing head mounted on a stand, a manually controlled switch at the front of the head, a downwardly facing dispensing outlet located rearwardly of the front, and actuating means in back of the outlet adapted to be engaged by the receptacle into which cream is to be dispensed to control a valve for dispensing a measured quantity of cream. This enables the receptacles into which cream is to be dispensed to be held in one hand under the outlet while operating the switch with the other hand to manually control the amount of cream to be dispensed or to automatically control the amount of cream to be dispensed by contacting the actuating means with the receptacle.

In the past, considerable difficulty has been encountered in properly aligning the small cream jars under the outlet while causing the jars to operate the actuating means, particularly during peak service hours when this operation must be performed hastily to promptly serve the patrons of the establishment. This often results in that a portion of the cream misses the jar and spills onto the stand unless the operator stoops and closely watches the jars while contacting the actuating means.

This slows down the operator, and any spilled cream not only is wasted but requires time to be consumed in wiping off the stand and the jar.

Accordingly, an object of the present invention is to overcome the foregoing difficulties and objections by providing a device for accurately aligning and supporting the small jars or containers under the dispensing outlet without watching the jars.

Another object is to provide such a device which is readily attached to newly manufactured apparatus and apparatus already in use and forms a part of the apparatus when so attached.

A further object is to provide such a device which is simple and economical in construction and is reliable in operation.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein.

Figure 1:
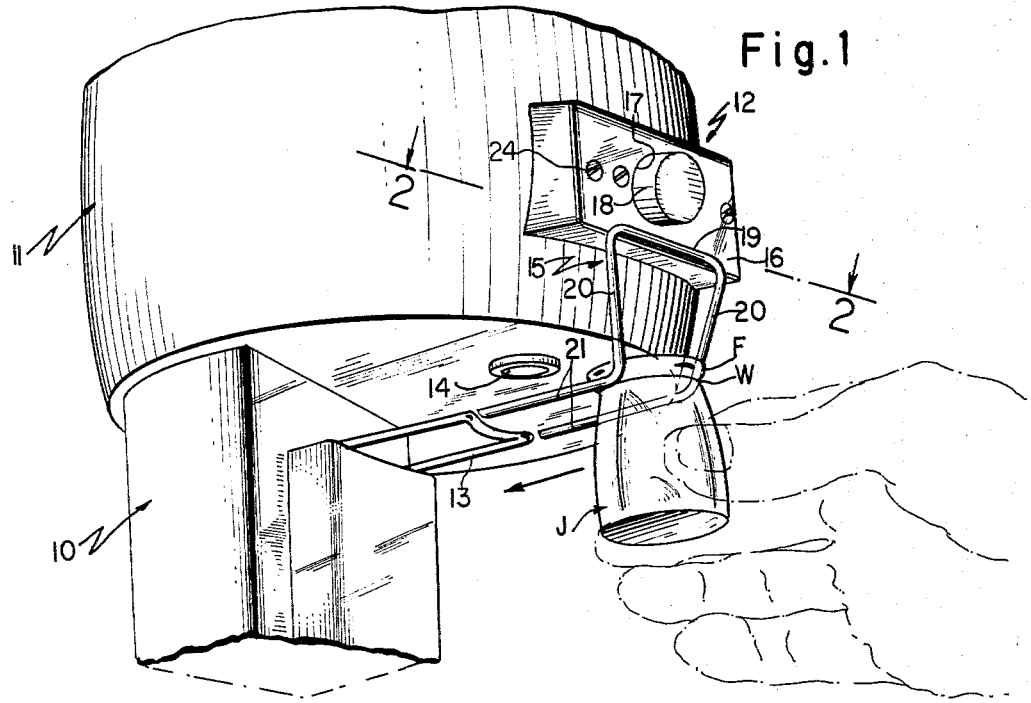
FIG. 1 is a fragmentary perspective view of a cream dispenser having a device in accordance with the present invention attached thereto.

Referring now to FIG. 1 of the drawing, apparatus is shown which generally comprises a base or stand 10, a cream dispensing head 11 mounted on the stand having a switch 12 at the front for controlling a valve (not shown) and having a downwardly facing dispensing outlet 14 disposed rearwardly of the front under control of the valve for discharging cream into a small jar J having a flange F near the top, a device 15 for guiding and supporting the jar beneath the outlet 14, and an actuating element 13 on the stand in back of the outlet 14 adapted to be engaged by the jar to limit its rearward movement and to cause the valve to open for an interval of time sufficient to fill the jar. The head 11 includes a front face such as a plate or cover 16 for the switch 12, the plate having an opening 17 through which a switch operating element 18 such as a push button extends outwardly.

Figures 2, 3:
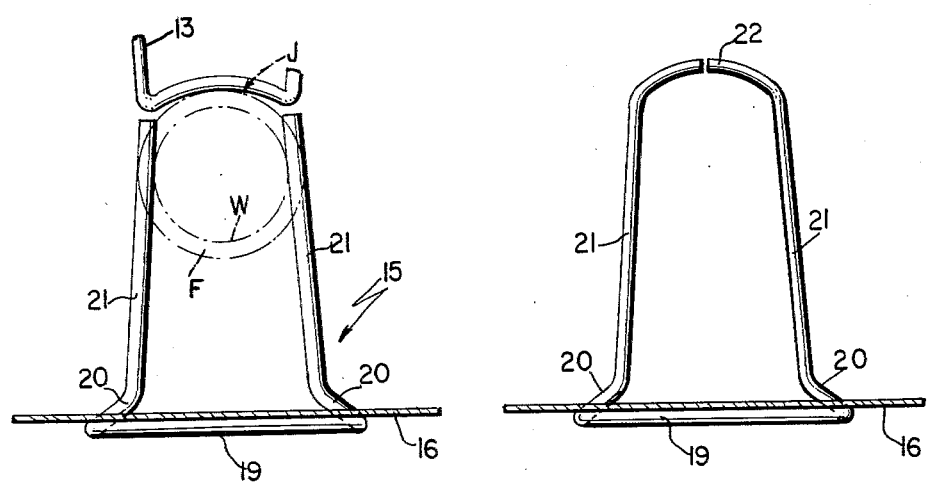
FIG. 2 is a sectional view taken along line 2—2 on FIG. 1.
FIG. 3 is a view similar to FIG. 2 illustrating a modification of the device.

As shown in FIGS. 1 and 2, the device 15 comprises a horizontal portion 19 secured to the front face by soldering or welding the same to the outer surface of the plate 16 at the lower edge thereof, a pair of side portions 20 respectively depending from the ends of the horizontal portion, 19, and a pair of substantially horizontal portions 21 respectively extending rearwardly from the lower ends of the side portions 20 and being spaced for extending under the flange F of the jar J and straddling the outlet 14 to guide the jar rearwardly and to support the same under the outlet 14 and in alignment therewith so that the cream is directed into the mouth the the jar without spillage.

In accordance with the present invention, the side portions 20 converge downwardly at an angle of about 170°, for example, and are spaced apart at their lower ends so that the flange of the jar can pass therebetween. The portion 21 converge rearwardly at an angle of about 4°, for example, and are so spaced apart to extend partially under the flange at their front ends and to more fully extend under the flange and guide the side wall W of the jar to engage and operate the actuating element in a manner whereby rearward movement of the jar is stopped just as it is properly aligned under the outlet 14. Preferably, the side portions 20 slant rearwardly (from top to bottom) at an angle of about 9°, for example, to induce a person inserting the flange of the jar between these portions to move the jar rearwardly and downwardly to seat the flange on the portions 21.

Preferably, as shown herein, the device 15 is formed of a single piece of rigid steel wire having a diameter of about 0.125 inch, for example, and having a surface which is easily maintained clean and bright.

The device 15 is particularly adapted for attachment to apparatus presently in use which apparatus includes all the elements shown and described herein except the device 15. This may be accomplished by removing the plate 16 which is removably secured to the dispensing head by screws 24, securing the device on the plate as shown, and replacing the plate. However, for the sake of convenience the device 15 is secured to the plate 16 at the factory, is acquired by the user of the apparatus, and the user removes the original plate 16 and replaces it with the new plate having the device 15 thereon. This also eliminates errors in properly positioning the device 15 on the plate 16.

In FIG. 3, a device 15 is shown for attachment to dispensing apparatus which is not equipped with an actuating element 13 for stopping rearward movement of the jar when the jar is aligned under the outlet. This device however is provided with a pair of arcuate, horizontal portions 22 at the respective ends of the portions 21 for so aligning the jar with one hand while utilizing a finger of the other hand to press the switch button 18.

The dispensing head valve and the valve control network and mechanism are the subject matter of another invention made by another inventor, and thus are not disclosed herein.

From the foregoing description, it will be seen that the present invention provides an improved guiding and supporting device for dispensing apparatus of the type indicated herein and for other forms of apparatus where a receptacle formed with a flange or its equivalent must be guided under a filling outlet.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

In apparatus for filling containers having a flange or bead at the top thereof and a side wall portion below the flange of smaller diameter than the flange, the combination of a dispensing head having a front face and a valved outlet at its underside for supplying fluid to fill the containers; a valve actuating element beneath said dispensing head having a horizontal portion located slightly rearwardly of said outlet; and a container guiding and supporting device including a unitary member formed of a strip of material and consisting of an upper horizontal portion secured to the front face of said dispensing head and being of greater length than the diameter of the container flange, a pair of converging side portions respectively depending from the ends of said horizontal portion and slanting rearwardly thereof and being spaced apart at their lower ends a distance just about sufficient for receiving the container flange, and a pair of converging substantially horizontal portions respectively extending rearwardly and beneath said dispensing head from the lower end of said side portions to said horizontal portion of said valve actuating element and straddling said outlet, the rear ends of said rearwardly extending horizontal portions being spaced apart at their rear ends a distance just about sufficient for receiving the container wall portion, whereby said side portions and said rearwardly extending horizontal portions serve to guide the container flange to a rear position to contact said horizontal portion of said valve actuating element and cause said element to be operated by the container flange when the container is positioned beneath said outlet while the container flange is supported by said rearwardly extending horizontal portions.

References Cited by the Examiner

UNITED STATES PATENTS

| | | | |
|---|---|---|---|
| 307,562 | 11/1884 | Matthews | 141—362 |
| 713,160 | 11/1902 | Schneider | 141—372 |
| 1,090,392 | 3/1914 | Gingras | 211—74 |
| 1,576,214 | 3/1926 | Paskal | 141—372 |
| 2,057,946 | 10/1936 | Harris | 211—75 |
| 3,112,844 | 12/1963 | Keller et al. | 141—370 X |

LAVERNE D. GEIGER, *Primary Examiner.*

H. BELL, *Assistant Examiner.*